UNITED STATES PATENT OFFICE.

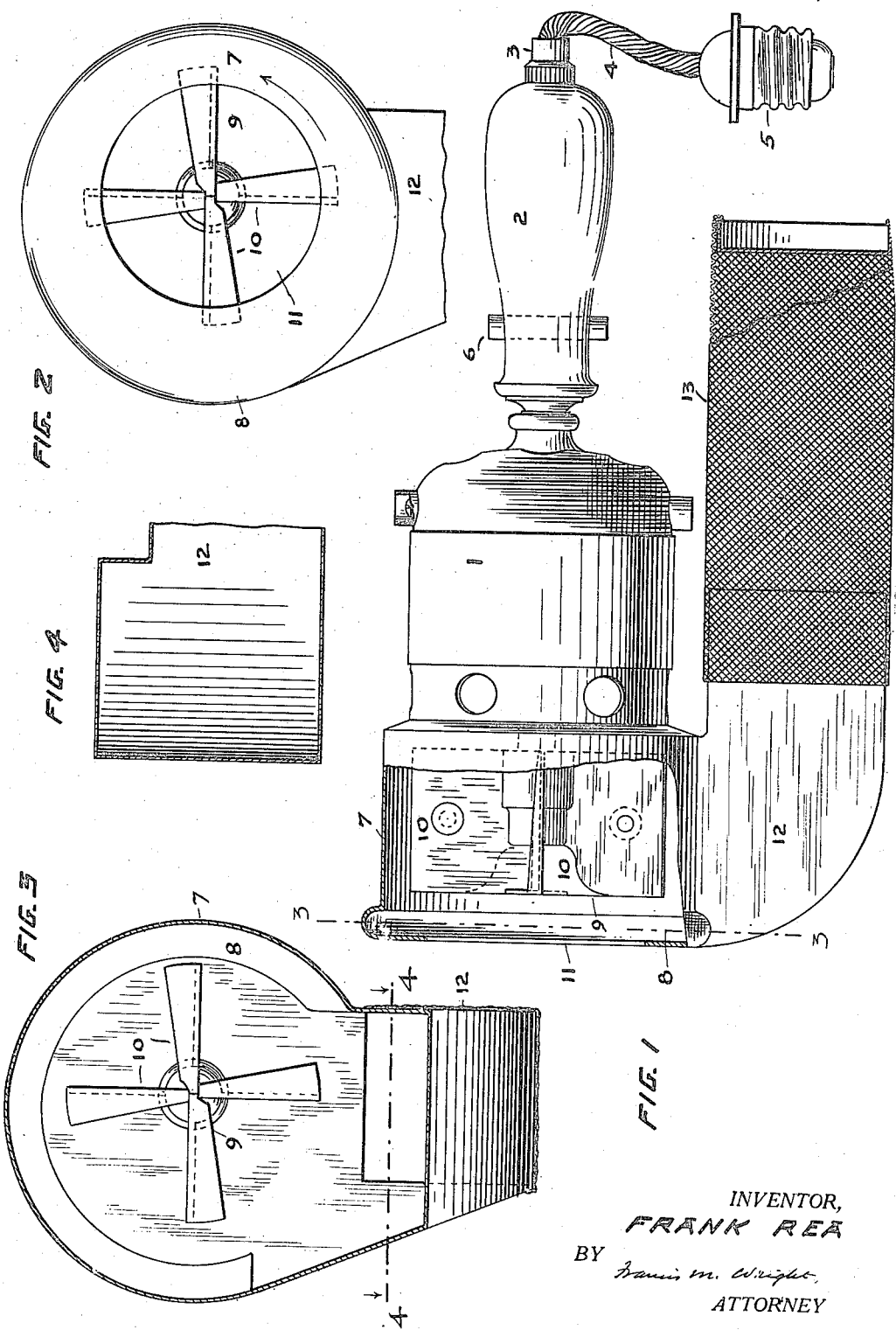

FRANK REA, OF SAN FRANCISCO, CALIFORNIA, ASSIGNOR OF ONE-HALF TO ARTHUR M. SHEAKLEY, OF SAN FRANCISCO, CALIFORNIA.

FLY-CATCHER.

1,165,712.  Specification of Letters Patent.  Patented Dec. 28, 1915.

Application filed May 17, 1915. Serial No. 28,713.

*To all whom it may concern:*

Be it known that I, FRANK REA, a citizen of the United States, residing at San Francisco, in the county of San Francisco and State of California, have invented new and useful Improvements in Fly-Catchers, of which the following is a specification.

The object of the present invention is to provide an improved catcher for catching flies and other bugs.

In the accompanying drawing, Figure 1 is a longitudinal section of my improved fly catcher; Fig. 2 is a broken end view thereof. Fig. 3 is a transverse section on the line 3—3 of Fig. 1; Fig. 4 is a section on the line 4—4 of Fig. 3.

Referring to the drawing, 1 indicates an electric motor casing to which is connected one end of a handle 2, to the other end of which handle is connected a tube 3, through which extends a lamp cord 4 leading from a plug 5 adapted to be connected with any ordinary electric lamp socket. Through said handle extends a switch 6 for electrically connecting the wires of the lamp cord to the terminals of the motor. On the end of said motor casing remote from the handle is secured eccentric thereto a fan casing 7, the outermost portion of which is enlarged, as shown at 8, to form an air-receiving chamber. On the motor shaft is secured in said fan casing a centrifugal fan 9, the blades 10 of said fan, although almost in contact with the casing at one portion thereof, being at a considerable distance therefrom at another portion. In the outer end of said fan casing is a round hole 11 of the same diameter as the fan. From said fan casing leads a conduit 12 which bends so as to be finally directed parallel with the motor shaft, and upon the open end of said conduit is secured a receptacle 13 of woven wire.

The blades of the fan are so formed that, when the fan rotates in the direction indicated by the arrow, the air is drawn in through the hole 11, and propelled radially outward by said fan into the enlargement 8 of the fan casing and eventually expelled therefrom and into the conduit 12 and receptacle 13, finally passing out through the walls of the receptacle. Therefore flies and other bugs in the vicinity of the fly catcher are drawn in by the suction of the air passing through the hole 11 and are propelled into the receptacle with such violence that by far the greater portion of them are destroyed or rendered incapable of escape.

I have found that the circumferential enlargement 8 is essential to the successful working of this apparatus.

It is found that with this apparatus places such as butcher shops, restaurants and the like, commonly visited by flies, can be cleared of flies in a very short space of time.

I claim:—

In combination an electric motor, a centrifugal suction fan on the shaft of the motor, an eccentric fan casing around said shaft and secured to the motor casing, said fan casing being enlarged at its front end to form an air-receiving chamber, said front end being apertured, said casing having a lateral open-ended conduit, and a receptacle communicating with the open end of said conduit and having air escape openings through its walls.

In testimony whereof I have hereunto set my hand in the presence of two subscribing witnesses.

FRANK REA.

Witnesses:
 FRANCIS M. WRIGHT,
 D. B. RICHARDS.